United States Patent
Schmidt

(10) Patent No.: US 12,420,917 B2
(45) Date of Patent: Sep. 23, 2025

(54) PASSIVE EDDY-CURRENT WHEEL BRAKE WITH CONICAL FORM

(71) Applicant: Safran Landing Systems Canada Inc., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 439 days.

(21) Appl. No.: 17/695,442

(22) Filed: Mar. 15, 2022

(65) Prior Publication Data
US 2023/0294822 A1    Sep. 21, 2023

(51) Int. Cl.
    *F16D 65/18*      (2006.01)
    *B64C 25/44*      (2006.01)
    *H02K 49/04*      (2006.01)
    *F16D 121/20*     (2012.01)

(52) U.S. Cl.
    CPC ............. *B64C 25/44* (2013.01); *F16D 65/18* (2013.01); *H02K 49/04* (2013.01); *F16D 2121/20* (2013.01)

(58) Field of Classification Search
    CPC ..................................................... H02K 49/04
    See application file for complete search history.

(56) References Cited

U.S. PATENT DOCUMENTS

| | | | |
|---|---|---|---|
| 9,638,273 B2 | 5/2017 | Schmidt | |
| 2007/0284478 A1* | 12/2007 | Soderberg | B64C 25/36 244/103 R |
| 2015/0204399 A1 | 7/2015 | Schmidt | |

FOREIGN PATENT DOCUMENTS

| | | | | |
|---|---|---|---|---|
| AU | 2004237817 A1 | * | 6/2005 | ............. B64C 25/36 |
| CN | 201122892 Y | | 9/2008 | |
| CN | 104608921 A | | 5/2015 | |
| DE | 10 2020 200 852 A1 | | 7/2021 | |
| GB | 2500442 A | * | 9/2013 | ........... B60K 7/0007 |
| JP | H053666 A | | 1/1993 | |
| JP | H0515141 A | | 1/1993 | |
| JP | H09191634 A | | 7/1997 | |
| JP | 2005073429 A | * | 3/2005 | |

OTHER PUBLICATIONS

English Machine translation for CN-104608921A (Year: 2015).*
International Search Report and Written Opinion mailed Jun. 9, 2023, issued in corresponding International Application No. PCT/CA2023/050255, filed Feb. 28, 2023, 12 pages.

* cited by examiner

*Primary Examiner* — Melody M Burch
(74) *Attorney, Agent, or Firm* — CHRISTENSEN O'CONNO JOHNSON KINDNESS PLLC

(57) ABSTRACT

A brake assembly is suitable for use in conjunction with a wheel having a rim rotatably mounted to an axle. The brake assembly includes a rotor configured to rotate about the axis with the rim. The rotor has a first frustoconical rotor surface and either a conductive element or a magnet. The brake assembly further includes a stator fixed in rotation about the axis and configured for selective translation parallel to the axis. The stator has a first frustoconical stator surface proximate to the first frustoconical rotor surface and a conductive element, when the stator has a magnet, or a magnet, when the stator has a conductive element.

9 Claims, 8 Drawing Sheets

PASSIVE EDDY-CURRENT WHEEL BRAKE WITH CONICAL FORM

BACKGROUND

Aircraft landing gear commonly utilize wheel brakes to slow and stop the aircraft during ground maneuvers and to assist other braking systems (thrust reversers, spoilers, etc.) to decelerate the aircraft after touch-down. Typical wheel brakes employ friction materials to provide a resistive torque and to convert kinetic energy to heat. A variety of configurations are possible, but all friction brakes wear, requiring regular maintenance and replacement of worn components. Additionally, the worn material is typically ejected from the brake as dust, which can contaminate surrounding components and, depending on the wear material, can represent a health hazard. It is desired to find alternative means of providing wheel braking to remedy these concerns.

FIGS. 1 and 2 show a landing gear system 20 with a known friction brake assembly 40. The landing gear system 20 includes a strut 12 and an axle assembly 24. One end of the strut 12 is coupled to the aircraft (not shown), and the other end of the strut is coupled to the axle assembly 24. In the illustrated embodiment, the axle assembly 24 extends laterally outward from the strut 12 and has a wheel 30 rotatably mounted to each end.

Referring now to FIG. 2, each wheel 30 includes a pneumatic tire 32 mounted to a rim 34. The rim 34 is mounted to the axle assembly 24 by a pair of tapered roller bearings 36. The bearings 36 allow the wheel 30 to rotate about the centerline 26 of the axle assembly 24.

At least one of the wheels 30 of the landing gear assembly 20 is associated with a frictional brake assembly 40. The brake assembly 40 applies a braking force to the wheel 30 that resists rotation of the wheel relative to the axle assembly 24. In this manner, the brake assembly can apply a braking force to slow a rotating wheel 30, thereby slowing the aircraft. In some embodiments, the brake assembly 40 is configured to apply a braking force to a stationary wheel 30 so that the brake assembly acts as a parking brake that prevents unwanted movement of a parked aircraft.

The brake assembly 40 is similar to the brake assembly disclosed in U.S. Pat. No. 8,839,918, issued to Thibault et al., and currently assigned to Safran Landing Systems, the disclosure of which is expressly incorporated herein. In this regard, the brake assembly 40 has an annular bracket 42 fixedly coupled to the axle assembly 24 of the landing gear. A plurality of linear actuators 44 are mounted to the annular bracket around the centerline 26 of the axle assembly 24. The linear actuators 44 selectively extend in unison to apply a force that compresses a stack 46 of alternating rotors 48 and stators 50. Each of the rotors 48 is keyed to the rim 34 of the wheel 30 so that the rotors rotate in unison with the wheel. Each of the stators 50 is keyed to the axle assembly 24 to remain rotationally fixed relative to the axle assembly 24. Thus, when aircraft wheels 30 rotate, e.g., during takeoff, landing, and taxiing, the rotors 48 rotate with the wheels relative to the axle assembly 24 and therefore, the stators 50.

When the actuators 44 extend, they compress the stack 46 so that adjacent rotors 48 and stators 50 engage each other. When the rotors 48 are rotating with the wheels 30, the friction between the rotors 48 and the stators 50 generate a resistive braking force that is reacted to the wheels through the stators.

An alternative to friction brakes for aircraft uses electromagnetic effects, notably "eddy-current" brakes, which generate a resistive torque due to the interaction of a fixed magnetic field and a rotating conductor (effectively, the inverse of an induction motor). The fixed magnetic field can be generated by electromagnets or by permanent magnets. The resistive torque that results from the brake depends on the speed of rotation of the conductor, the conductivity of the conductor, and the magnetic flux density (among other parameters). In order to vary the braking torque, most eddy-current brake designs modulate the magnetic flux density: with an electromagnet, by varying the current applied to the magnet coil; with a permanent magnet solution, by varying the airgap between the magnet and the conductor.

U.S. Pat. No. 9,638,273, issued to Schmidt, and currently assigned to Safran Landing Systems UK Ltd., the disclosure of which is expressly incorporated herein, discloses an electromagnet eddy-current brake assembly in which the electromagnets are also used as a form of electronically commutated motor. The brake assembly has a stator that includes at least one electromagnetic coil and is moveable in a direction parallel to the rotational axis of the wheel between a first position and a second position. In the first position, the electromagnetic coil is inductively coupled to the first portion of the rim when the wheel is rotating relative to the at least one electromagnetic coil. In the second position, the electromagnetic coil is inductively coupled to the second portion of the rim. When the rotor is in the first position, the brake assembly provides a braking force on the wheel. When the rotor is in the second position, the brake assembly generates power due to rotation of the wheel.

For aircraft in particular, it is desirable to minimize the weight and size of braking systems. Embodiments of an eddy-current brake assembly in accordance with aspects of the present disclosure provide a compact system with improved control and performance as compared to known eddy-current brake assemblies.

SUMMARY

In accordance with an embodiment of the present disclosure, a brake assembly is provided. The brake assembly is suitable for use in conjunction with a wheel having a rim rotatably mounted to an axle about an axis. The brake assembly includes a rotor configured to rotate about the axis with the rim. The rotor has a first frustoconical rotor surface and either a conductive element or a magnet. The brake assembly further includes a stator fixed in rotation about the axis and configured for selective translation parallel to the axis. The stator has a first frustoconical stator surface proximate to the first frustoconical rotor surface and either a conductive element (when the stator has a magnet) or a magnet (when the stator has a conductive element).

In any embodiment, the brake assembly further includes a fitting fixedly coupled to the axle, wherein the stator is slidingly coupled to the stator.

In any embodiment, the brake assembly further includes a brake stack comprising a frictional rotor mounted to the rim for rotation about the axis and a frictional stator fixed in rotation about the axis; and an actuator configured to selectively compress the brake stack, wherein compression of the brake stack provides a frictional braking force.

In any embodiment, the frictional stator is mounted to the bracket.

In any embodiment, the actuator is mounted to the bracket.

In any embodiment, the actuator is mounted to the stator.

In any embodiment, the rotor further comprises a second frustoconical rotor surface, and the stator further comprises a second frustoconical stator surface proximate to the second frustoconical rotor surface.

In any embodiment, the magnet is a permanent magnet.

In any embodiment, the magnet is an electromagnet.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Embodiments of an eddy-current brake assembly are provided. The brake assemblies utilize the relative motion between adjacent stators and rotors to induce eddy currents that result in resistive braking torque. The resulting braking torque varies in part on the distance (airgap) between the stator and the rotor. Embodiments of the disclosed braking assembly utilized rotors and stators with corresponding frustoconical surfaces. The geometry of the stators and rotors provide more precise control of the airgap as compared to known eddy-current brake systems.

Figure 3:
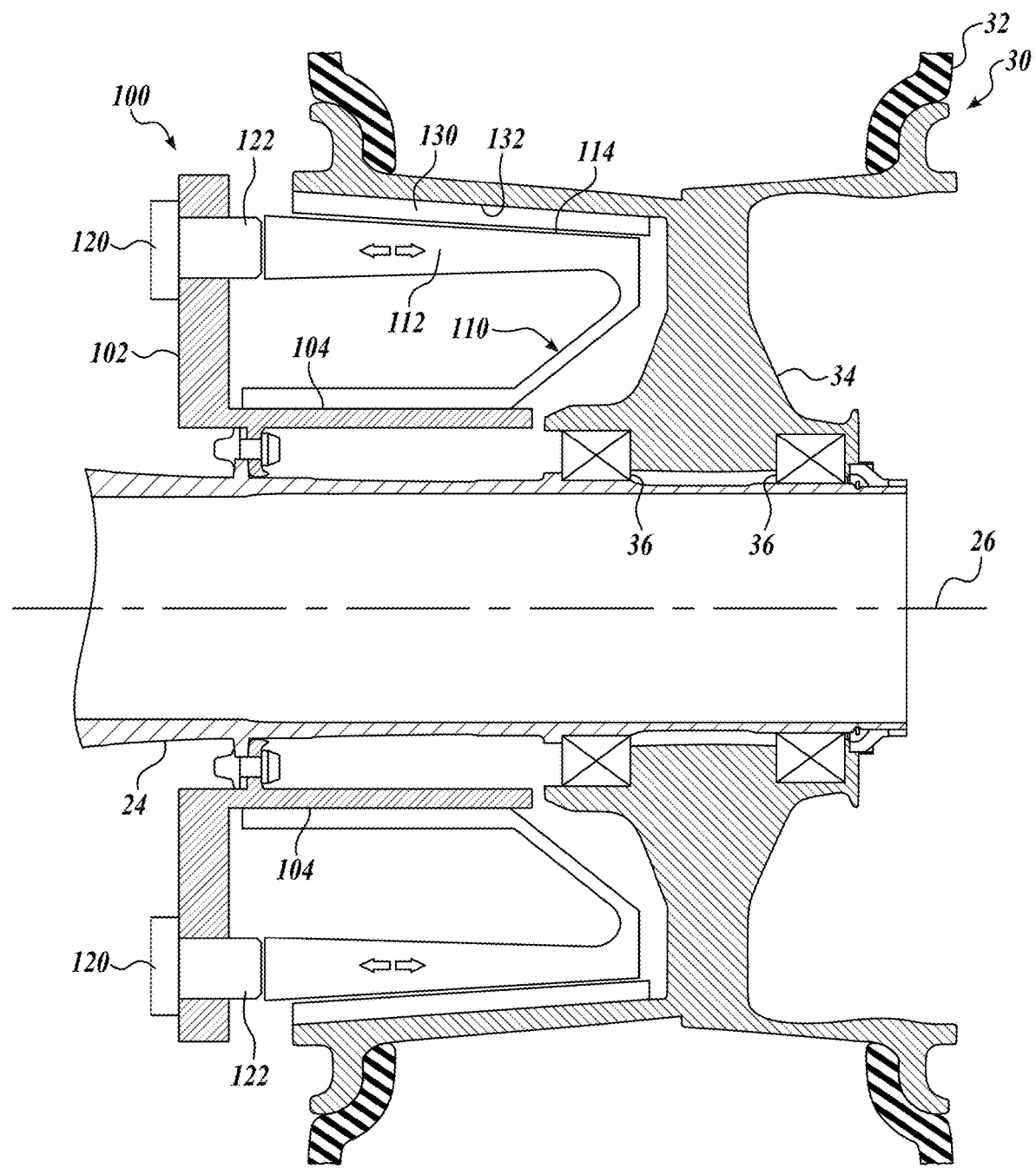
FIG. 3 shows a partial cross-sectional view of a first representative embodiment of an eddy-current brake assembly according to aspects of the present disclosure.
Figure 4:
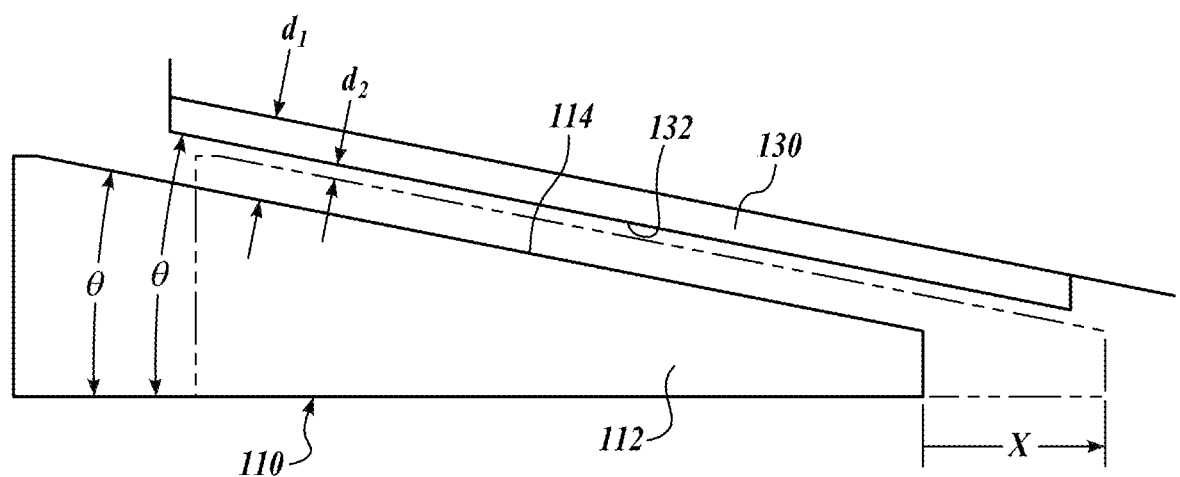
FIG. 4 shows an enlarged portion of the eddy-current brake assembly of FIG. 3, wherein a stator is shown in a first position and a second position.

FIGS. 3 and 4 show a first representative embodiment of a brake assembly 100 according to aspects of the present disclosure. The brake assembly 100 is shown used with the wheel 30 and axle assembly 24 of previously described landing gear system 20. For the sake of brevity, the wheel 30 and axle assembly 24 will not be described again with the understanding that the components of the wheel and axle assembly correspond to the previously described components except as noted.

The brake assembly 100 includes an annular bracket 102 fixedly mounted to and at least partially surrounding the axle assembly 24. A plurality of splines 104 is formed parallel to the centerline 26 along an outer surface of the bracket 102. A stator 110 is mounted to the bracket 102 and configured for sliding translation in the direction of the centerline 26 of the axle assembly 24. The stator 110 engages the splines 104 of the bracket 102 so that the stator is fixed in rotation about the centerline 26 relative to the axle assembly 24 while being slidably guided in the direction of the centerline relative to the axle assembly. The stator 110 defines a frustoconical outer surface 114 with a centerline coincident with the centerline 26 of the axle assembly 24

One or more actuators 120 are mounted to the bracket 102. In some embodiments with multiple actuators 120, the actuators are arranged in a radial pattern around the centerline 26. The actuators 120 are configured to selectively translate the bracket in the direction of the centerline 26. In some embodiments, the actuators 120 are rotary actuators configured to rotate corresponding ball screws 122 that engage the stator 110. Rotation of the ball screws 122 by the actuators 120 extends and retracts the ball screws to selectively translate the stator 110 relative to the bracket 102. In other embodiments, one or more of the actuators 120 are linear actuators. In some embodiments, the actuators 120 are any suitable actuator configured to selectively reciprocate the stator 110 relative to the bracket 102 in the direction of the centerline 26.

A rotor 130 is fixedly associated with the wheel 30 and is configured to rotate about the centerline 26 with the wheel. In some embodiments, the rotor 130 is coupled to the rim 30. In some embodiments, the rotor 130 is integrally formed with the rim 30. In the illustrated embodiment, the rotor 130 has an annular shape that extends around the axle assembly 24. In some embodiments, the rotor 130 includes two or more discreet portions mounted to the rim, wherein each portion extends partway around the axle assembly 24.

The rotor 130 includes a frustoconical inner surface 132 proximate to the frustoconical outer surface 114 of the stator 110. Like the frustoconical outer surface 114 of the stator 110, the frustoconical inner surface 132 of the rotor 130 has a centerline coincident with the centerline 26 of the axle assembly 24. The frustoconical inner surface 132 of the rotor 130 also has the same or similar apex angle θ as the frustoconical outer surface 114 of the stator 110. In some embodiments the apex angle θ of the frustoconical inner surface 132 of the rotor 130 is within 10° of the apex angle θ of the frustoconical outer surface 114 of the stator 110.

As best shown in FIG. 4, the offset inner surface 132 of the rotor 130 and outer surface 114 of the stator 112 are separated by an airgap. Moving the stator 112 in the direction of the centerline 26 increases or decreases the size of the airgap between the surfaces 114 and 132, depending on the direction of the movement. For example, as shown in FIG. 4, moving the stator 112 a distance X to the right decreases the size of the airgap, i.e., the distance between the surfaces, from $d_1$ to $d_2$. Conversely, moving the stator 112 a distance X to the left increases the size of the airgap. The offset configuration in combination with the frustoconical shapes of the surfaces 114 and 132 provides for improved control of the distance d between the surfaces 114 and 132 by translating the stator 112 in the direction of the centerline 26.

Referring again to FIGS. 3 and 4, the rotor 130 is magnetic, i.e., generates a magnetic field. In some embodiments, the rotor 130 is formed by permanent magnets or electromagnets attached to the rim 34. In some embodiments, the magnets include a series of linear Halbach arrays or any other magnet arrangement or combination of magnet arrangements that optimizes the flux density. In some embodiments, the magnets are mounted directly to the rim 34 by adhesives, mechanical fasteners, an intermediate carrier, or any other suitable configuration. In some embodiments, an intermediary heat shield (not shown) is positioned between the magnets and the rim 34.

At least a portion of the stator 110 is formed from a highly conductive material. In some embodiments, the material is copper or any other suitably conductive material. In some embodiments, the entire stator 110 is formed of the conductive material. In some embodiments, only the outer portion 112 of the stator 110 proximate to the frustoconical surface 114 is formed of the conductive material.

Operation of the braking assembly 100 will now be described with reference to FIGS. 3 and 4. When the aircraft is on the ground and moving, the magnetic rotor 130 rotates about the centerline 26 of the axle assembly 24 with the wheel 30. The rotation of the magnetic rotor 130 relative to the conductive stator 110 induces eddy currents in the stator 110, which heats the stator 110. This transformation of kinetic energy from the rotating wheel 30 into heat causes a resistive, i.e., braking, torque that acts against rotation of the wheel 30. Because the magnetic flux density, and therefore the magnitude of the torque, varies with the distance between the stator 110 and the rotor 130, the braking force can be selectively increased or decreased by translating the stator 110 to vary the air gap to achieve the desired brake force. Because of the cooperating frustoconical geometry of the stator 110 and the rotor 130, movement of the stator in the direction of the centerline 26 provides a proportionally smaller change in the airgap between the stator 110 and the rotor 130, thereby providing more accurate control of the airgap as compared to known brake systems.

It will be appreciated that the illustrated embodiment of FIGS. 3 and 4 is representative only, and various changes can be made therein without departing from the spirit and scope of the disclosure. In some embodiments, the rotor includes a conductive portion, and the stator includes a magnetic portion so that eddy currents are induced in the rotor rather than the stator. In some embodiments, one or both of the rotor and stator are formed from two or more discreet components so that the surfaces that define the air gap are not continuous surfaces. In some embodiments, the magnetic field is provided by an electromagnet, a permanent magnet, or any suitable combination different magnets.

An eddy-current brake is by nature a passive braking system. That is, the braking forces are generated in response to rotation of the wheels. As previously noted, the magnitude of the resistive torque provided from eddy-current brake depends, in part, on the speed of rotation of the conductor. As the rotational speed of the wheel decreases, the amount of available braking force also decreases. Accordingly, it can be advantageous to provide supplemental braking capabilities for a vehicle traveling at low speeds or stopped.

Figure 5:
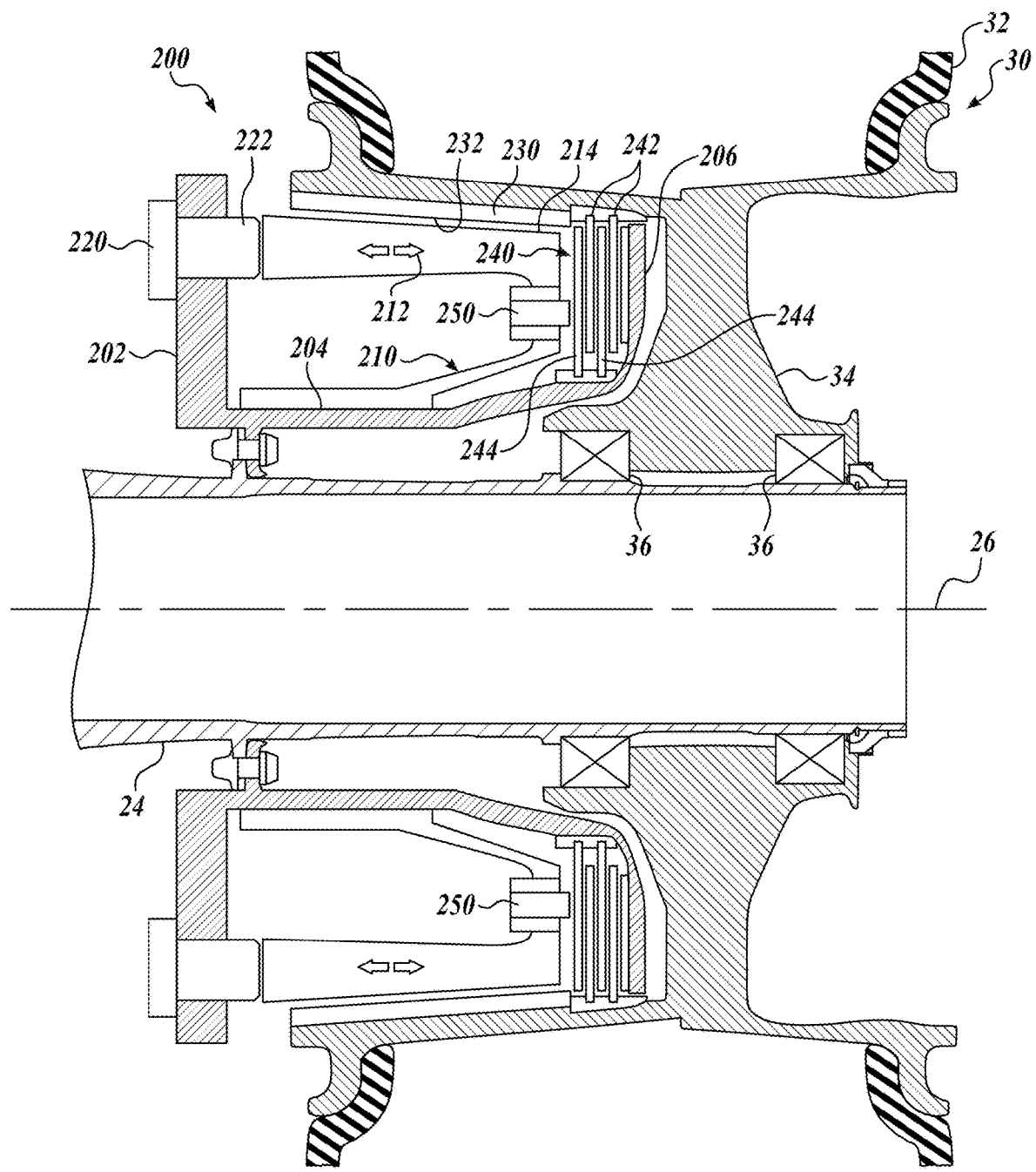
FIG. 5 shows a partial cross-sectional view of a second representative embodiment of an eddy-current brake assembly according to aspects of the present disclosure.

FIG. 5 shows another representative embodiment of a brake assembly 200 according to aspects of the present disclosure. The illustrated brake assembly 200 is shown used with the previously described wheel 30 and axle assembly 24. Various components of the brake assembly 200 are similar in form and function to those of the previously described brake assembly 100. For the sake of brevity, these similar parts will not be described again with the understanding the components of brake assembly 200 identified by reference number 2XX correspond to similar components of brake assembly 100 identified with reference number 1XX unless otherwise noted. For example, actuator 220 and rotor 230 shown in FIG. 5 correspond to actuator 130 and rotor 130, respectively, shown in FIGS. 3 and 4.

In addition to stator 210 and rotor 230 that provide eddy-current braking, the brake assembly 200 further includes a frictional brake to supplement braking capabilities at low speeds or when the vehicle is stopped. In this regard, the brake assembly 200 has a brake stack 240 that is selectively compressed by an actuator 250.

The brake stack 240 includes alternating supplemental stators 244 and supplemental rotors 242. The supplemental stators 244 are mounted to the bracket 202 and are fixed in rotation about the centerline 26 of the axle assembly 24. The supplemental rotors 242 are fixedly associated with the rim 34 of the wheel 30 and rotate relative to the supplemental stators 244 as the wheel rotates.

An actuator 250 is mounted to the stator 210 and is configured to selectively compress the brake stack 240 against an end plate 206 so that the supplemental stators 244 frictionally engage the supplemental rotors 242. In some embodiments, the actuator 250 is a rotary actuator operably coupled to a ball screw so that selective rotation of the ball screw reciprocates the ball screw in the direction of the centerline 26 of the axle assembly 24. In some embodiments, the actuator 250 is a linear actuator or any other suitable actuator configured to selectively compress the brake stack 240 against the end plate 206.

Still referring to FIG. 5, in some embodiments, the end plate 206 is integrally formed with the bracket 202. In some embodiments, the end plate 206 is not integral to the stator 210 but is fixedly located relative to the stator by any suitable configuration.

Figure 1:
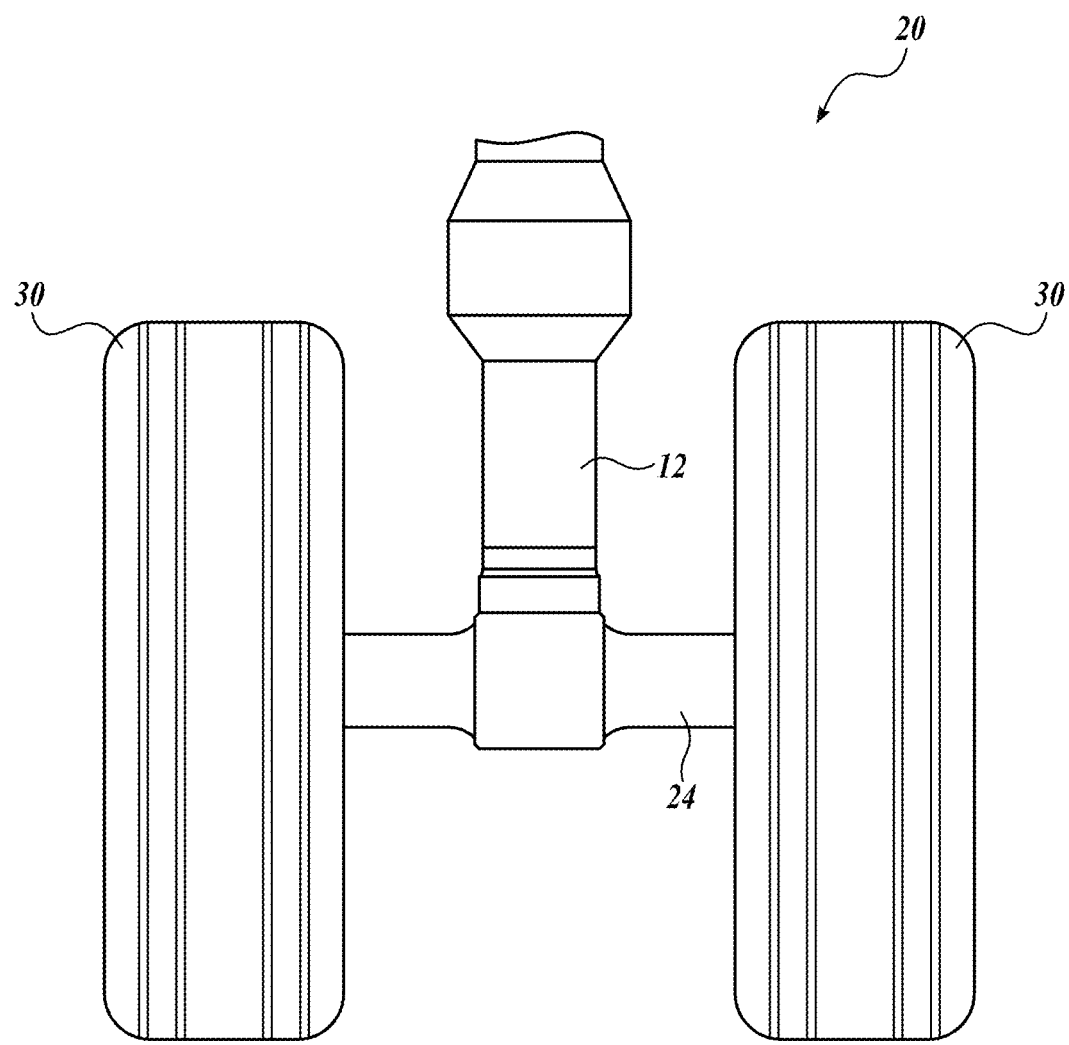
FIG. 1 shows a rear view of a landing gear system assembly suitable for use with a brake assembly according to the present disclosure.
Figure 2:
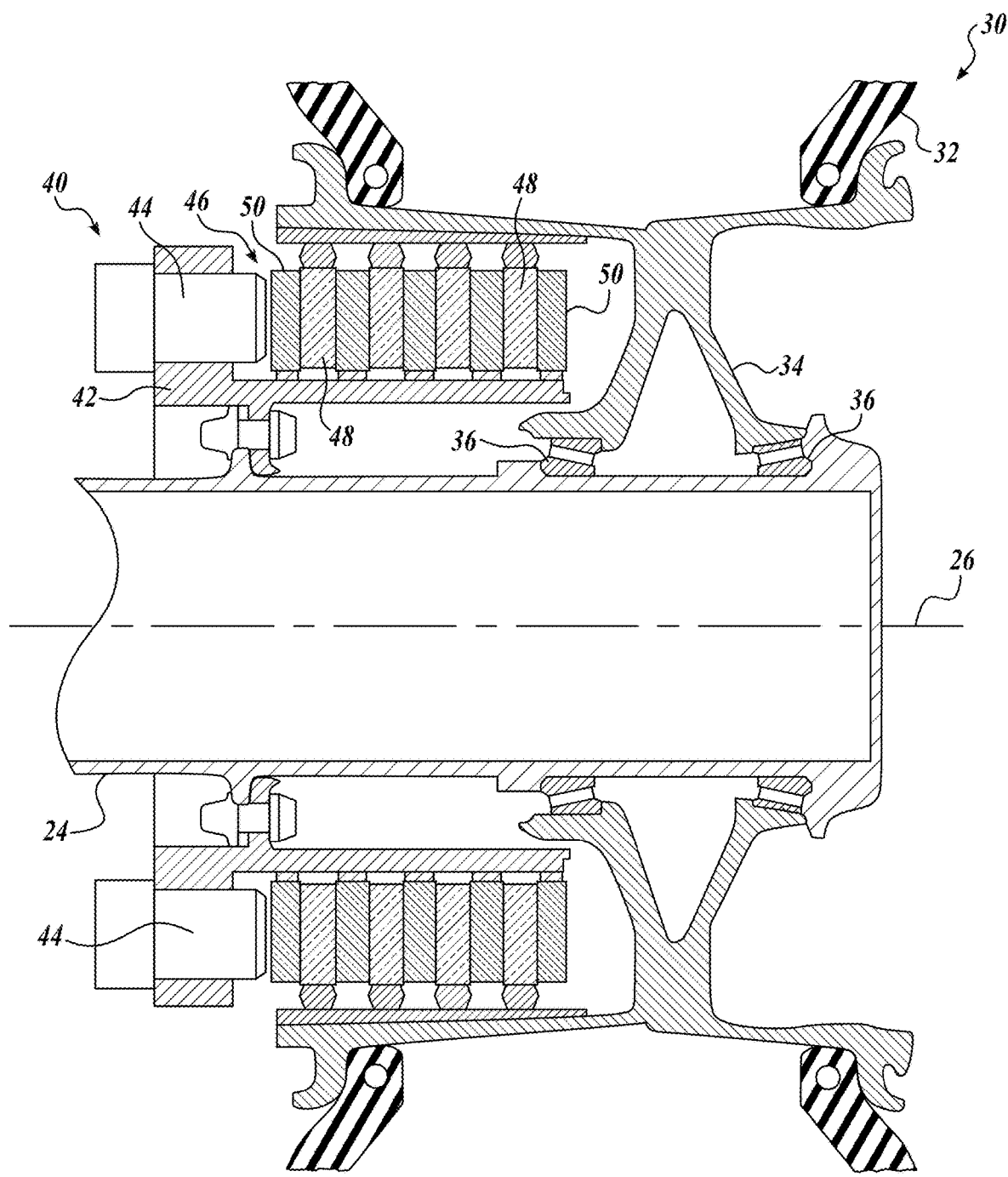
FIG. 2 shows a partial cross-sectional view thereof with a known frictional brake assembly.

The brake stack 240 and actuator 250 operate in a manner similar to the traditional friction brake assembly 60 shown in FIG. 1 to provide additional braking capacity that supplements the eddy-current brake forces generated by the stator 210 and rotor 230. In some embodiments, the additional braking capacity is provided when the aircraft is taxiing at low speeds or is stopped and eddy-current braking is limited due to the low rotational speed or lack of rotation of the wheels. In some embodiments, the additional braking capacity is provided at any speed. In some embodiments, the actuator 250 compresses the brake stack 240 when the aircraft is stationary to act as a parking brake.

Figure 6:
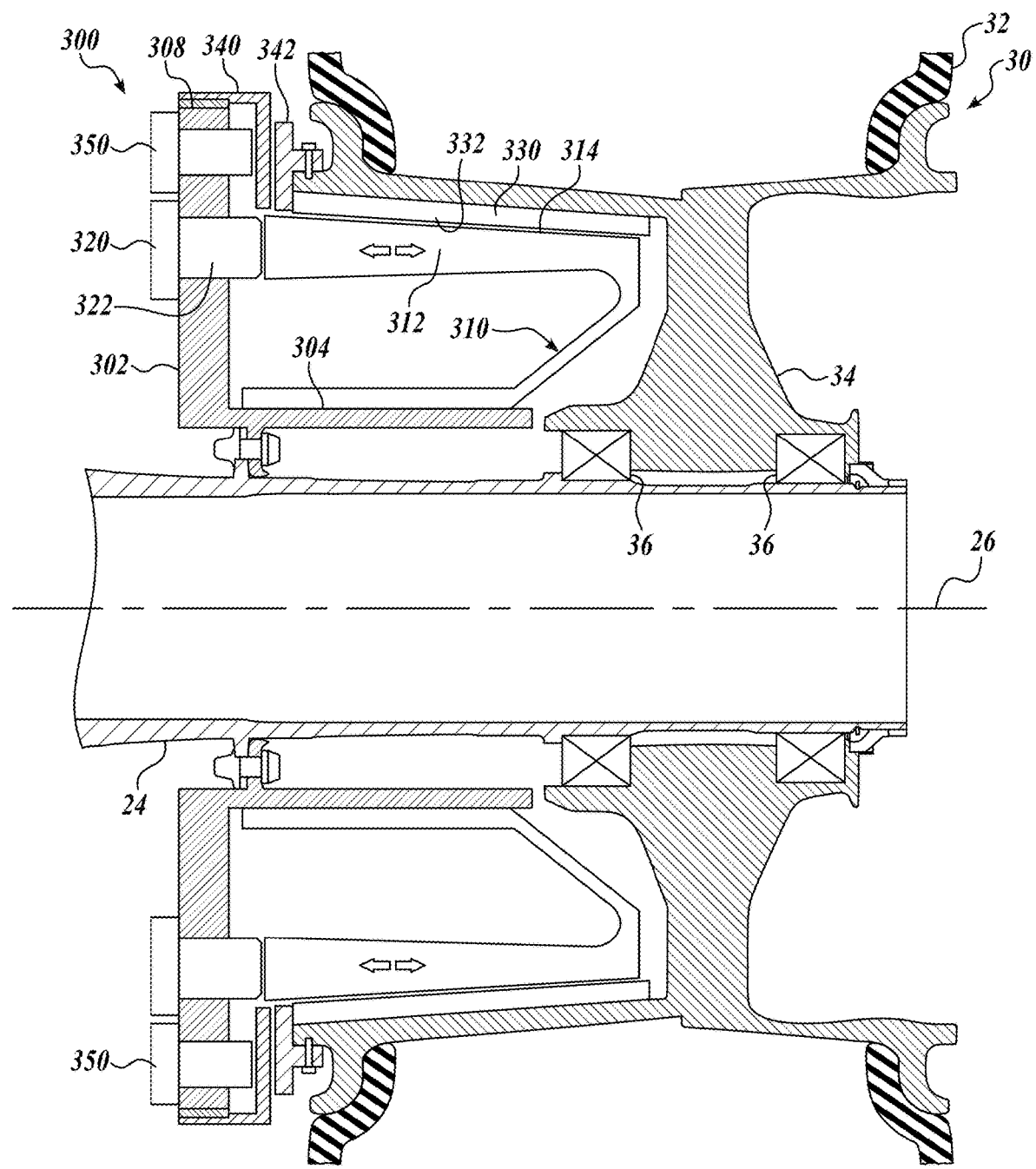
FIG. 6 shows a partial cross-sectional view of a third representative embodiment of an eddy-current brake assembly according to aspects of the present disclosure.

FIG. 6 shows another representative embodiment of a brake assembly 300 according to aspects of the present disclosure. The illustrated brake assembly 300 is similar to the brake assembly 200 shown in FIG. 5. For the sake of brevity, similar parts will not be described again with the understanding the components of brake assembly 300 identified by reference number 3XX correspond to similar components of brake assembly 200 identified with reference number 2XX unless otherwise noted. For example, actuator 320 and rotor 330 shown in FIG. 6 correspond to actuator 230 and rotor 230, respectively, shown in FIG. 5.

The brake assembly 300 of FIG. 6 includes a supplemental stator 340 slidingly coupled to the bracket 302 by one or more splines 308 or any other suitable configuration so that the supplemental stator is fixed in rotation about the centerline 26 of the axle assembly 24. The supplemental stator 340 is located at a radially outward edge of the bracket 302 and has a face normal to the centerline 26 of the axle assembly 24. A supplemental rotor 342 is coupled to the rim 34 of the wheel 30 proximate to the supplemental stator 340 so that the supplemental rotor 342 rotates with the wheel 30.

An actuator 350 is mounted to the bracket 302 proximate to the supplemental stator 340 and is configured to selectively drive the supplemental stator into frictional contact with the supplemental rotor 342. In some embodiments, the actuator 350 is a rotary actuator operably coupled to a ball screw so that selective rotation of the ball screw reciprocates the ball screw in the direction of the centerline 26 of the axle assembly 24. In some embodiments, the actuator 350 is a linear actuator or any other suitable actuator configured to selectively drive the supplemental stator 340 into the supplemental rotor 342.

The supplemental stator 340, the supplemental rotor 342, and the actuator 350 operate in a manner similar to the traditional friction brake assembly 60 shown in FIG. 1 to provide additional braking capacity that supplements the eddy-current brake forces generated by the stator 310 and rotor 330. In some embodiments, the additional braking capacity is provided when the aircraft is taxiing at low speeds or is stopped, and eddy-current braking is limited due to the low rotational speed or lack of rotation of the wheels. In some embodiments, the additional braking capacity is provided at any speed. In some embodiments, the actuator 350 compresses drives engagement of supplemental stator 340 with the supplemental rotor 342 when the aircraft is stationary to act as a parking brake.

Figure 7:
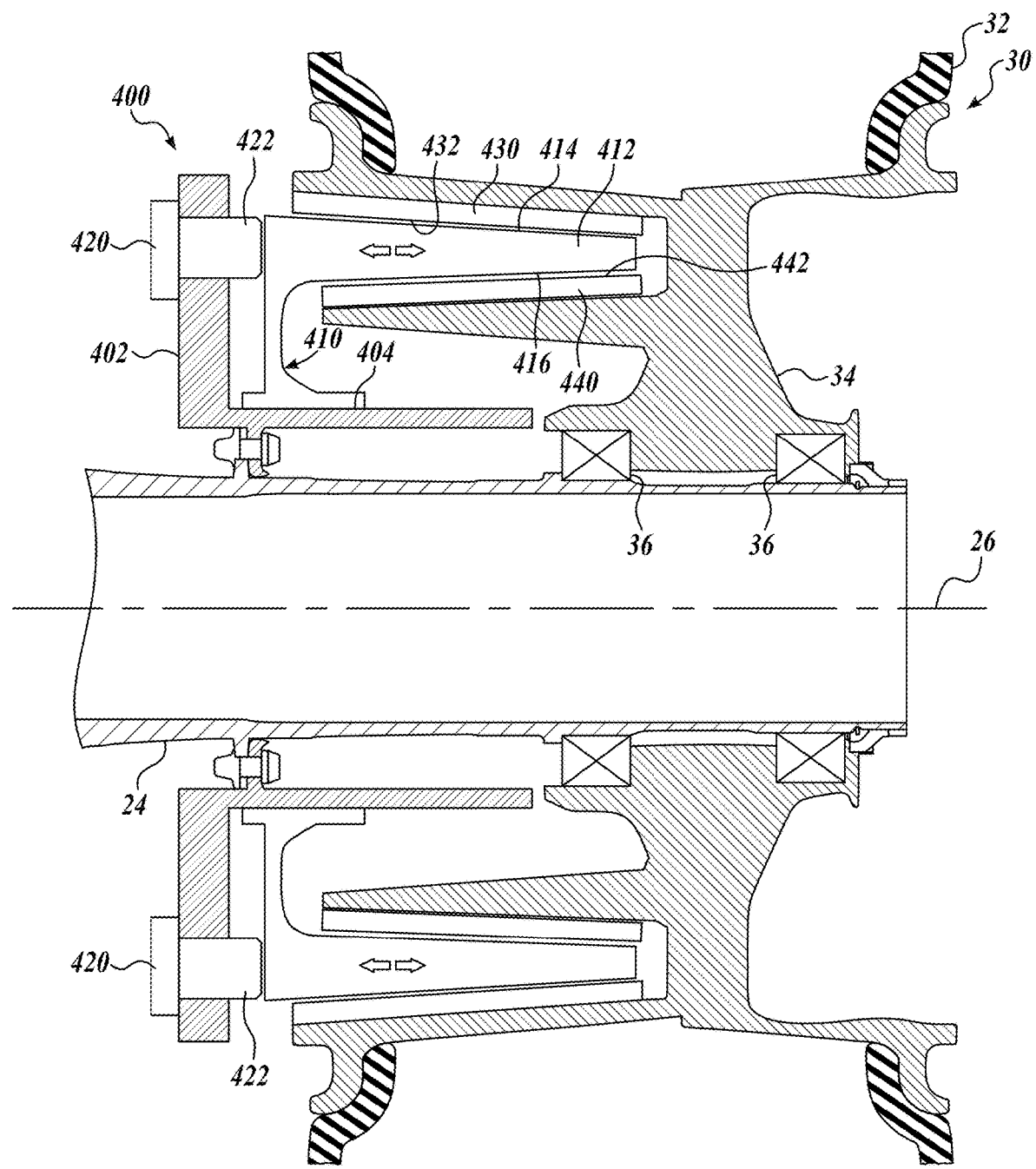
FIG. 7 shows a partial cross-sectional view of a fourth representative embodiment of an eddy-current brake assembly according to aspects of the present disclosure.

FIG. 7 shows another representative embodiment of a brake assembly 400 according to aspects of the present disclosure. The illustrated brake assembly 400 is shown used with the previously described wheel 30 and axle assembly 24 shown in FIGS. 3 and 4. Various components of the brake assembly 400 are similar in form and function to those of the previously described brake assembly 100. For the sake of brevity, these similar parts will not be described again with the understanding the components of brake assembly 400 identified by reference number 4XX correspond to similar components of brake assembly 100 identified with reference number 1XX unless otherwise noted, For example, actuator 420 and rotor 430 shown in FIG. 7 correspond to actuator 120 and rotor 130, respectively, shown in FIGS. 3 and 4.

In the illustrated embodiment, the outer portion 412 of the stator 410 includes a frustoconical inner surface 416 with a centerline coincident with the centerline 26 of the axle assembly 24. A second rotor 440 is mounted to the rim 34 of the wheel 30 and has a frustoconical outer surface 442 with a centerline coincident with the centerline 26 of the axle assembly 24. The outer surface 442 of the second rotor 440 is offset from the inner surface 416 of the stator 440 so that selective movement in the direction of the centerline 26 varies the air gap between the surfaces.

Either the stator 410 or the second rotor 440 is magnetic, and the other of the stator 410 and the second rotor 440 includes a conductive material. As the second rotor 440 rotates with the wheel 30, the magnetic component induces eddy currents in the conductive portion to provide additional eddy-current braking capability. The magnitude of the magnetic field to which the conductive component is exposed varies with the air gap as the stator 410 is selectively moved in the direction of the centerline 26 of the axle assembly 24. Accordingly, the brake assembly 400 provides increased braking capability, wherein the total resistive brake force is controlled by selectively translating the stator 410 along the direction of the centerline 26 of the axle assembly 24.

Figure 8:
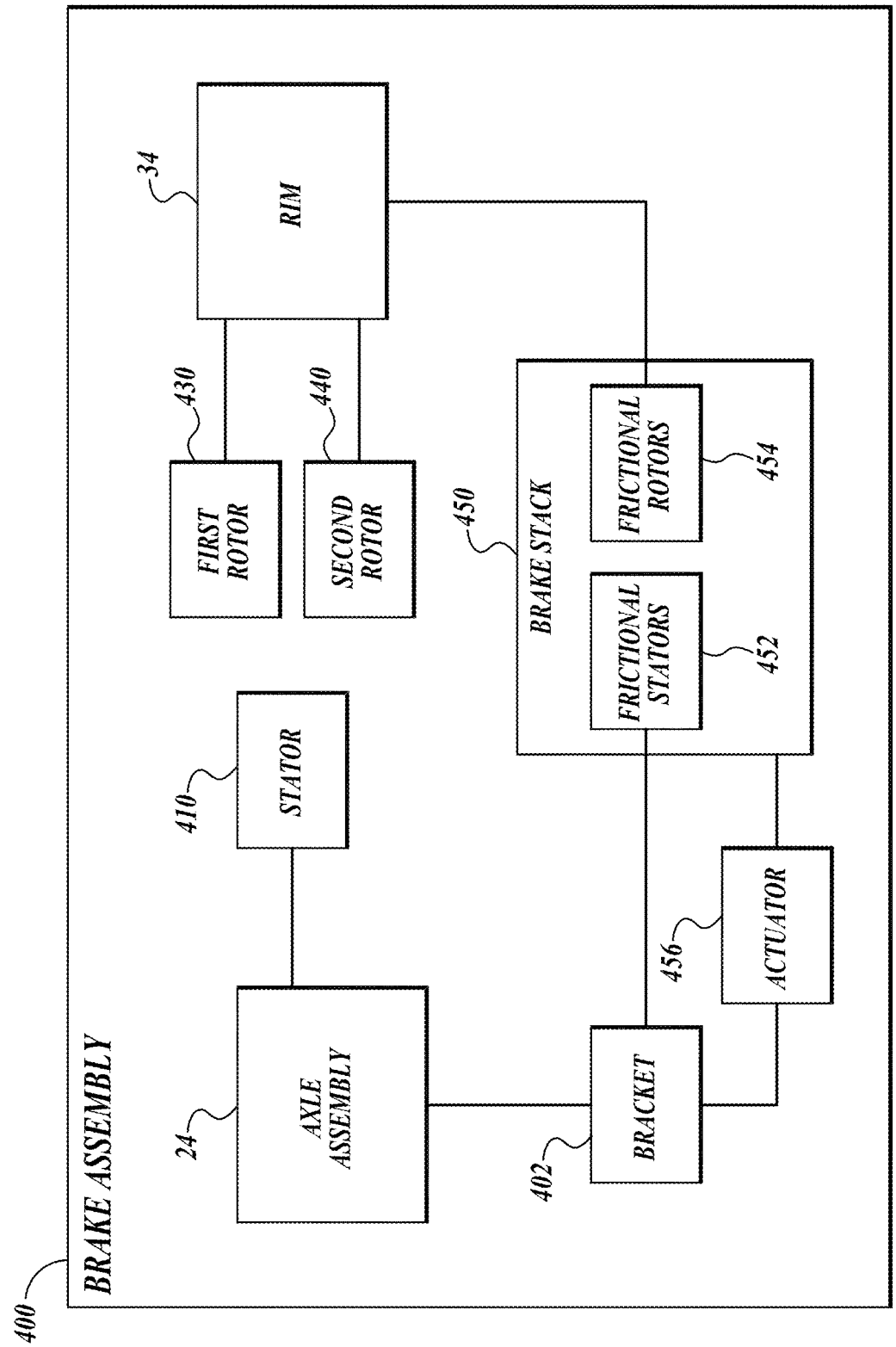
FIG. 8 shows a schematic view of an embodiment of the eddy-current brake assembly of FIG. 7 with a frictional brake stack.

As shown in FIG. 8, embodiments of the brake assembly 400 may further include a brake stack 450 comprising a plurality of frictional rotors 454 mounted to the rim 34 for rotation about the axis 26 and a plurality of frictional stators 452 mounted to a bracket 402, which is coupled to the axle assembly 24 to be fixed in rotation about the axis 26. An actuator 456 is coupled to the bracket 402 and is configured to selectively compress the brake stack 450.

The disclosed brake assemblies are described being used in conjunction with aircraft landing gear; however, it will be appreciated that embodiments of the disclosed brake assemblies can be utilized with other vehicles, including maglev vehicles, trains, automobiles, semi-trailer trucks, roller coasters, or any other suitable vehicle.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A brake assembly for a vehicle having a wheel with a rim rotatably mounted to an axle about an axis, the brake assembly comprising:
   a first rotor configured to rotate about the axis with the rim, the first rotor comprising (i) a first frustoconical rotor surface and (ii) a first element comprising one of a conductive material and a magnetic material;
   a second rotor configured to rotate about the axis with the rim, the second rotor comprising (i) a second frustoconical rotor surface and (ii) a second element comprising the same one of the conductive material and the magnetic material as the first rotor; and
   a stator fixed in rotation about the axis and configured for selective translation parallel to the axis, the stator comprising (i) a first frustoconical stator surface proximate to the first frustoconical rotor surface (ii) a second frustoconical stator surface proximate to the second frustoconical rotor surface, the first and second frustoconical stator surfaces comprising the other of the conductive material and the magnetic material as the first and second rotors.

2. The brake assembly of claim 1, further comprising:
   a bracket fixedly coupled to the axle;
   a brake stack comprising a plurality of frictional rotors mounted to the rim for rotation about the axis and a plurality of frictional stators fixed in rotation about the axis; and
   an actuator mounted to the bracket and configured to selectively compress the brake stack.

3. The brake assembly of claim 2, wherein the plurality of frictional stators is mounted to the bracket.

4. The brake assembly of claim 2, wherein at least one of the plurality of frictional stators is disposed between two of the plurality of frictional rotors.

5. The brake assembly of claim 2, wherein at least one of the plurality of frictional rotors is disposed between two of the plurality of frictional stators.

6. The brake assembly of claim 1, wherein the first and second elements comprise the conductive material and the first and second frustoconical stator surfaces comprise the magnetic material.

7. The brake assembly of claim 1, wherein the first and second elements comprise the magnetic material and the first and second frustoconical stator surfaces comprise the conductive material.

8. The brake assembly of claim 1, wherein the magnetic material comprises a permanent magnet.

9. The brake assembly of claim 1, wherein the magnetic material comprises an electromagnet.

* * * * *